US010885928B1

(12) United States Patent
Owechko (10) Patent No.: US 10,885,928 B1
(45) Date of Patent: Jan. 5, 2021

(54) MIXED DOMAIN BLIND SOURCE SEPARATION FOR SENSOR ARRAY PROCESSING

(71) Applicant: HRL Laboratories, LLC, Malibu, CA (US)

(72) Inventor: Yuri Owechko, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 56 days.

(21) Appl. No.: 16/127,927

(22) Filed: Sep. 11, 2018

Related U.S. Application Data (60) Provisional application No. 62/624,054, filed on Jan. 30, 2018.

(51) Int. Cl.

| G10L 21/028 | (2013.01) |
|---|---|
| H04R 3/00 | (2006.01) |
| H04R 1/40 | (2006.01) |
| H04R 1/10 | (2006.01) |
| H04B 1/10 | (2006.01) |

(52) U.S. Cl.
CPC .......... *G10L 21/028* (2013.01); *H04B 1/1081* (2013.01); *H04R 1/406* (2013.01); *H04R 3/005* (2013.01)

(58) Field of Classification Search
CPC ..... G10L 21/028; H04B 1/1081; H04R 1/406; H04R 3/005
See application file for complete search history.

(56) References Cited

U.S. PATENT DOCUMENTS

| 9,668,066 B1 * | 5/2017 | Betts | H04R 25/40 |
|---|---|---|---|
| 2016/0358107 A1 * | 12/2016 | Kokkinis | G06N 20/00 |

OTHER PUBLICATIONS

Lakmal et al., "Blind Source Separation in Real Time Using Second Order Statistics", Master of Science thesis, Blekinge Institute of Technology Sep. 2007.*
11. Yang et al., "Time-Frequency Filter Bank: A Simple Approach for Audio and Music Separation", IEEE Access, vol. 5, 2017.*

* cited by examiner

*Primary Examiner* — Catherine T. Rastovski
(74) *Attorney, Agent, or Firm* — Ladas & Parry (57) ABSTRACT

A method for increasing accuracy and reducing computational requirements for blind source separation of mixtures of signals in multi-path environments includes receiving a plurality of channel inputs, each channel input comprising a mixture of signals from a plurality of sources, performing a short time Fourier transform on each channel input of the plurality of channels, wherein a respective output of a respective short time Fourier transform on a respective channel is a respective time-frequency distribution for the respective channel, vectorizing each respective time-frequency distribution into a respective mixed frequency and time vector, combining each respective mixed frequency and time vector into a mixed frequency and time matrix, and performing blind source separation on the mixed frequency and time matrix to separate the mixture of signals from the plurality of sources into a plurality of signal source channels, each respective signal source channel comprising signals from a respective source.

22 Claims, 8 Drawing Sheets

MIXED DOMAIN BLIND SOURCE SEPARATION FOR SENSOR ARRAY PROCESSING

CROSS REFERENCE TO RELATE APPLICATIONS

This application is related to and claims priority from U.S. Provisional Patent Application Ser. No. 62/624,054, filed Jan. 30, 2018, which is incorporated herein by reference as though set forth in full.

STATEMENT REGARDING FEDERAL FUNDING

None

TECHNICAL FIELD

This disclosure relates to extraction and analysis of signals from a sensor array.

BACKGROUND

Prior art approaches for blind separation of convolutive signal mixtures are based on applying non-convolutive blind source separation (BSS) solutions such as independence component analysis (ICA) in the frequency domain. By performing a short-time Fourier transform on each of the mixture signals, the convolutions are converted into multiplications and additions of the source signals in the Fourier domain, which can be handled by conventional BSS methods. However, an issue that arises is the output permutation ambiguity of BSS. The ordering of the separated sources cannot be predicted beforehand. In other words the output port on which a particular source signal will appear is unknown and can vary depending on the sensing conditions. In the signal domain this ambiguity is normally not an issue, but in the Fourier domain it is essential that the different frequency channels have the correct order for each of the separate sources, otherwise the signals will be greatly distorted when they are transformed back to the signal domain. Existing Fourier-domain BSS methods perform a separate BSS operation on each frequency channel and then use greedy channel matching methods to order the output channels. Greedy matching requires the signal in a frequency channel to be similar to the signal in the adjacent channel. This requirement is not always met which results in errors that can propagate to subsequent channels.

What is needed is an improved method for blind source separation of convolutive signal mixtures. The embodiments of the present disclosure answer these and other needs.

SUMMARY

In a first embodiment disclosed herein, a method for increasing accuracy and reducing computational requirements for blind source separation of mixtures of signals in multi-path environments comprises receiving a plurality of channel inputs, each channel input comprising a mixture of signals from a plurality of sources, performing a short time Fourier transform on each channel input of the plurality of channels, wherein a respective output of a respective short time Fourier transform on a respective channel is a respective time-frequency distribution for the respective channel, vectorizing each respective time-frequency distribution into a respective mixed frequency and time vector, combining each respective mixed frequency and time vector into a mixed frequency and time matrix, and performing blind source separation on the mixed frequency and time matrix to separate the mixture of signals from the plurality of sources into a plurality of signal source channels, each respective signal source channel comprising signals from a respective source.

In another embodiment disclosed herein, a device for blind source separation of mixtures of signals in multi-path environments comprises a plurality of sensor inputs, each sensor input comprising a mixture of signals from a plurality of sources, and a processor coupled to each sensor input, the processor configured for: performing a short time Fourier transform on each sensor input of the plurality of sensor inputs, wherein a respective output of a respective short time Fourier transform on a respective sensor input is a respective time-frequency distribution for the respective sensor input, vectorizing each respective time-frequency distribution into a respective mixed frequency and time vector, combining each respective mixed frequency and time vector into a mixed frequency and time matrix, and performing blind source separation on the mixed frequency and time matrix to separate the mixture of signals from the plurality of sources into a plurality of signal source channels, each respective signal source channel comprising signals from a respective source.

In yet another embodiment disclosed herein, a method for fast blind source separation of convolutive mixtures of streaming signals using preprocessing of inputs for reducing a computation burden comprising: sensing M signal mixtures X, performing a short time Fourier transform (STFT) for each signal mixture to generate a M×N mixed frequency and time domain data matrix $Z^{(p)}$ for a block p of input data, where a block has T time samples of the signal mixtures X, and where N is the number of time samples times the number of frequency bins in $Z^{(P)}$, performing a multi-domain blind source separation (BSS) on $Z^{(p)}$ to generate a S×M mixed-domain demixing matrix $B^{(p)}$, where S, the number of signals S in the M signal mixtures and where S is equal to M, multiplying the M×N matrix $Z^{(p)}$ by $B^{(p)}$ to generate an S×N estimate $W^{(p)}$ of the source signals S, outputting source signals Y in the time domain by reformatting $W^{(p)}$ into time-frequency distributions, performing inverse STFTs on the time-frequency distributions, measuring a M×N mixed-domain data block matrix $Z^{(p+1)}$ for the next input data block p+1, preprocessing $Z^{(p+1)}$ by multiplying $Z^{(p+1)}$ with $B^{(p)}$ to partially demix the data block p+1, performing multi-domain BSS on the preprocessed $Z^{(p+1)}$ to generate a mixed-domain S×M demixing matrix $B^{(p+1)}$, multiply the preprocessed $Z^{(p+1)}$ by $B^{(p+1)}$ to generate an estimate $W^{(p+1)}$ of the source signals in the mixed domain, reformatting $W^{(p+1)}$ into time-frequency distributions, and performing inverse STFTs to output source signals Y in time domain.

These and other features and advantages will become further apparent from the detailed description and accompanying figures that follow. In the figures and description, numerals indicate the various features, like numerals referring to like features throughout both the drawings and the description.

BRIEF DESCRIPTION OF THE DRAWINGS

FIGS. 3A, 3B and 3C show a method for fast updating using preprocessing of inputs for reducing computation required for streaming mode mixed domain BSS of convolutive mixtures, FIG. 3A corresponds to FIG. 2A with matrices X, Z, W and Y identified, and FIGS. 3B and 3C show a flow chart in accordance with the present disclosure.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

The present invention describes a mixed domain method for performing blind source separation (BSS) of convolutive mixtures of signals which enables individual signals to be extracted and analyzed despite interference from the other signals. Convolutive signal mixtures are measured by sensor networks or arrays when signals from each source are divided among multiple paths with different delays due to multiple reflections and scattering events in their propagation from emission sources to the sensors. Examples of such sensing systems include microphone arrays that record multiple sound signals in a reverberative environment, smart antennas that receive RF signals reflected and scattered in urban environments, and sonar sensor arrays that detect signals that follow multiple paths in an ocean environment. Mixed domain BSS is "blind" in that it requires no prior knowledge of the signals or training and so can extract previously unknown signals for further analysis, which is useful for detection of anomalies that otherwise would not be detected.

Mixed domain BSS of convolutive mixtures is superior to prior art Fourier-domain BSS methods because the output ordering of the frequency channels is guaranteed to always be correct for all of the separated output signals. In addition, only a single BSS operation needs to be performed instead of one per frequency channel, which greatly simplifies the algorithm and reduces computational requirements. The computational requirements may be reduced by a factor of F/R, where F is the number of frequency channels and R is the number of time samples in the short time frequency transform (STFT) distributions shown in FIGS. 1A and 2A. F is also equal to the size of the sliding time window used to calculate the STFTs. F must be equal to or greater than L, the length of the channel filter defined in Equation 1 below.

By using a single BSS operation, a sliding window for real-time separation of data streams can also be implemented by initializing the solution for the current window using the solution from the previous window. This greatly speeds up the BSS operation since the algorithm has to only adapt to changes in the data stream statistics, which again reduces computational requirements.

Mixed domain BSS is useful for increasing the accuracy, reliability, and efficiency of sensing systems that operate in environments with multiple signal paths with different delays that result in convolutive mixtures. Examples of such systems include, but are not limited to, speech recognition in reverberative car and airplane interiors with background noise, vibration cancellation systems, real-time engine and other rotating machinery diagnostics and prognostics, smart antenna arrays in multi-path environments, extraction of weak sonar signals from background interference, and analysis of EEG signals.

Prior art methods for frequency domain separation of convolutive mixtures have focused on different methods for attempting to correct the ordering ambiguity in the blind separation of each frequency channel into source signals, and these prior art methods have errors as discussed above.

In the present invention, by interleaving the time and frequency bins, all of the frequency channels can be processed simultaneously using a single blind source separation stage, which forces all of the channels to have the same source signal ordering. The actual reduction to practice of the present invention has been established by demonstrating separation of convolutive mixtures of audio speech signals.

The application that this invention addresses is the extraction of source signals from signal mixtures sensed in real-world environments using multiple sensors in a multi-path or reverberative environment. Such signal mixtures can be represented as a sum of convolutions of source signals with different channel filters as shown in Equation 1:

$$x_i(k) = \sum_{j=1}^{n} \sum_{p=0}^{L} a_{ij}(p) s_j(k-p) \qquad (1)$$

where $x_i(k)$ is the mixture of signals from the plurality of sources for channel i at time k;

where $s_j$ is a signal from source j;

where n is a number of sources;

where p is an time index ranging from 0 to L; and where the $a_{ij}$ are the filter coefficients representing the delays of the transmission channels for different paths. Equation 1 corresponds to the example mixture of signals shown in FIGS. 1A and 2A with reference numbers 10, 12, and 14.

Figure 1A:
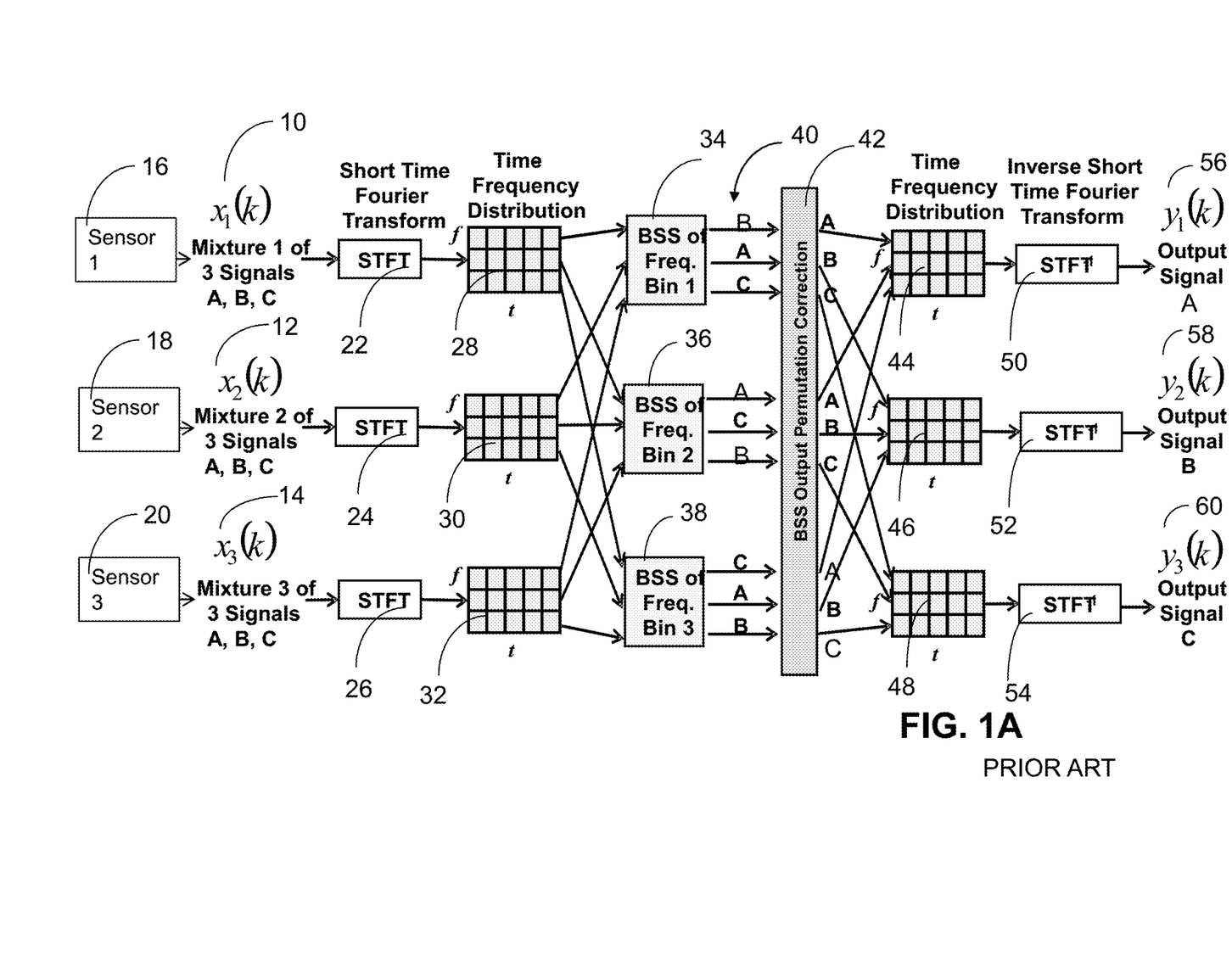
FIG. 1A shows an approach for frequency domain blind source separation of convolutive signal mixtures using separate BSS stages for each frequency bin in accordance with the prior art.
Figure 2A:
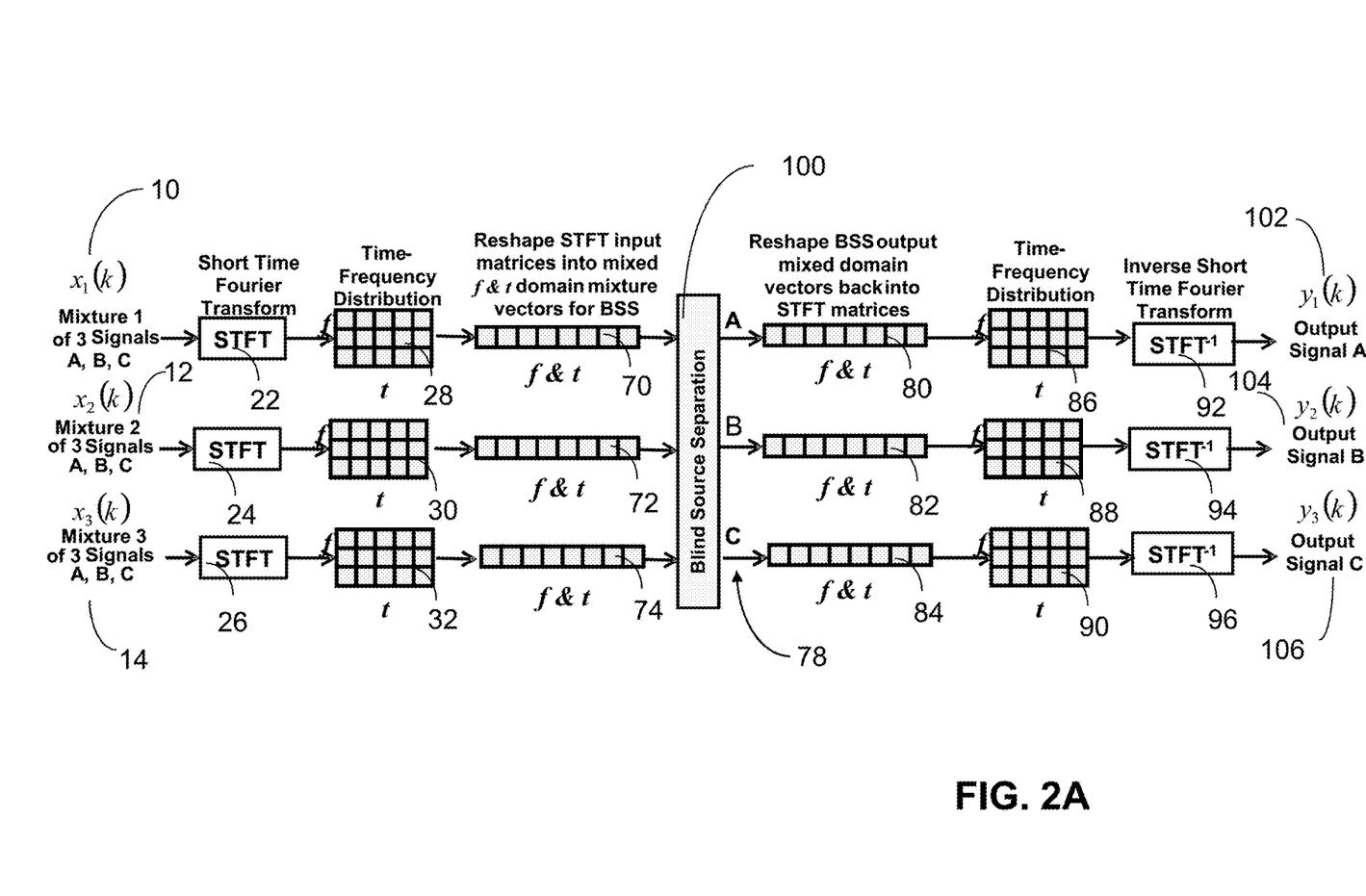
FIG. 2A shows a mixed-domain method for blind source separation of convolutive signal mixtures.

By performing a short-time Fourier transform (STFT) on the above representation, the convolutive mixtures can be represented by a matrix-vector multiplication in the Fourier or frequency domain as represented by Equation 2, which corresponds to the example time frequency distributions shown in FIGS. 1A and 2A with reference numbers 28, 30, and 32.

$$\tilde{X}(f,k) = A(f)\tilde{S}(f,k) \qquad (2)$$

In other words, the convolutive mixtures are converted to simple mixtures consisting of weighted sums of the source signals. Blind source separation (BSS) methods such as independent component analysis (ICA) have been used in the prior art to separate the simple mixtures into the source signals for further application-dependent processing of pure interference-free signals. Various ICA methods can be used for the separation based on maximizing different measures of statistical independence of the output signals. One ICA algorithm that can be used is the JADE algorithm.

Figure 1B:
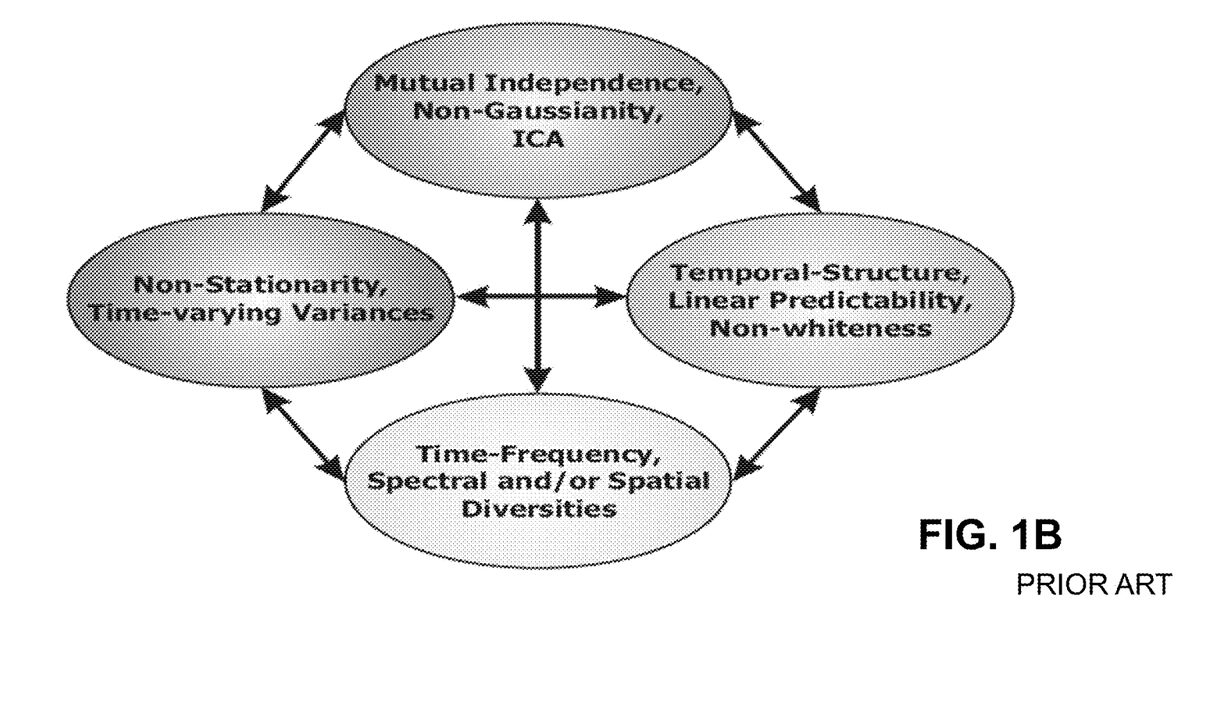
FIG. 1B shows methods for blind source separation in accordance with the prior art.

ICA is one BSS method and other BSS methods known in the prior art, including ICA, are shown in FIG. 1B. Each approach exploits some a priori knowledge and specific properties of the source signals. Mixed domain BSS can utilize any of them. In FIG. 1B the BSS methods are grouped into different groups based on the signal properties used for demixing.

A complicating challenge that prevents straight forward application of ICA in the frequency domain followed by conversion back to the original signal domain is the output port ordering ambiguity of ICA and BSS in general. Due to its blind and unsupervised properties, ICA by itself cannot predict which source signal will appear on which output port. In addition the ordering can be different for different mixing matrices or small changes in the input signals.

The order ambiguity is illustrated in the flow chart for prior art convolutive mixture BSS methods shown in FIG. 1A. As shown in FIG. 1A, a separate BSS operation is performed for each frequency bin. Mixtures for each BSS operation consist of the same frequency bin taken from the STFT of each input mixture. In FIG. 1A, assume there are 3 source signals A, B and C and 3 input source signal mixtures 10, 12 and 14 from 3 sensors 16, 18 and 20, respectively, in the original signal domain. For ease of illustration, 3 frequency channels are used in each short time Fourier transform (STFT) 22, 24, and 26, which perform the STFT for the 3 input source signal mixtures 10, 12 and 14, respectively, for a window over time. In the examples shown in FIGS. 1A and 2A the window is five time t samples long; however, other window lengths may be used. Generally, a series of sliding windows are used and each sliding window may overlap the next sliding window by varying amounts, such as about half the window length. The time frequency distribution (TFD) matrices for the output of the STFTs 22, 24, and 26 are shown as TFDs 28, 30, and 32, respectively. The TFDs are arranged by frequency bin in one dimension and time in the other dimension. A separate BSS operation is performed for each frequency bin, so the separate BSS operations in this example are BSS 34 for the time samples in frequency bin 1, BSS 36 for the time samples in frequency bin 2, and BSS 38 for the time samples in frequency bin 3. The outputs 40 of the 3 BSS modules 34, 36, and 38 are labeled with the source signal indices A, B and C and show that each BSS 34, 36 and 38 output has a different ordering of frequency domain source signals A, B, C. An output permutation correction (OPC) stage 42 is required to force the correct ordering of each set of BSS outputs from BSS 34, 36, and 38, so that the output of the BSS output permutation correction 42 is ordered by signal source A, B, C, so that the outputs can be combined correctly. A time frequency distribution 44, 46 and 48 is formed for each signal source A, B and C. For example, time frequency distribution 44 has only frequency bins and time samples for signal source A. Inverse STFTs 50, 52 and 54 are then be applied to the TFDs 44, 46 and 48 to recover the separated signals 56, 58 and 60, which are for signal source A, B and C, respectively, in the original signal time domain.

Using multiple BSS modules 34, 36 and 38 with the OPC stage 42 results in a complicated and computationally complex system that has several disadvantages. The BSS output permutation correction 42 must use some measure of similarity between different outputs or detect distinguishing features in order force the different BSS stages to have the same output orderings. Such measures may have varying performance depending on the nature of the signals and so must be adapted or selected in real-time. In addition, such an approach is sensitive to error propagation, because an error made for one output can cause additional errors for other outputs. The computation complexity is high because the number of BSS modules is equal to the number of frequency bins in the STFTs, which can be in the hundreds, or even in the thousands or higher. Finally, the information in the input mixtures is divided among the BSS modules, thereby reducing the performance of each compared with a single BSS module which can use all of the available information to separate the signals.

Figure 2B:
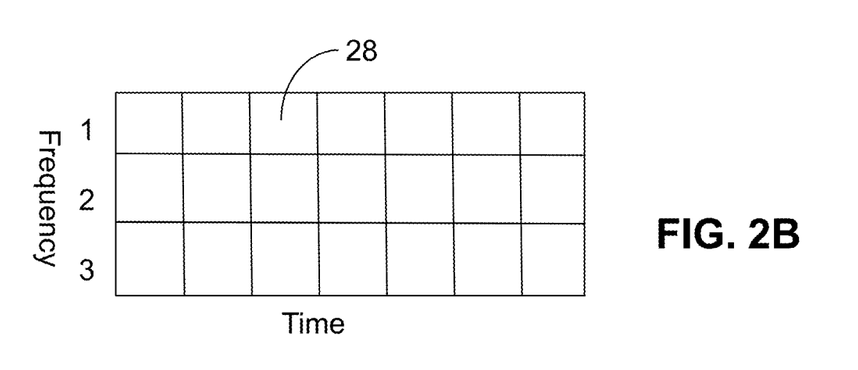
FIGS. 2B and 2C show details of FIG. 2A in accordance with the present disclosure.
Figure 2C:
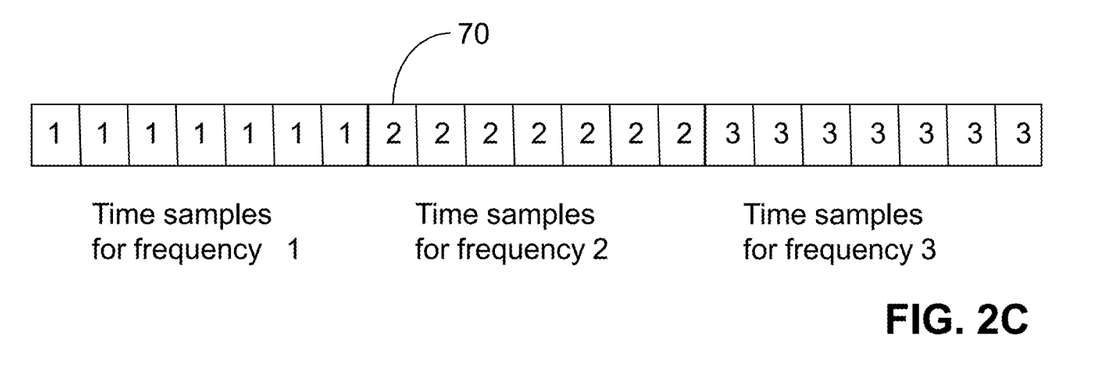

The present invention overcomes the above limitations by recognizing that the output port ordering ambiguity can be eliminated by using only a single BSS module 100, as shown in FIG. 2A. The time frequency distributions (TFDs) 28, 30 and 32 from the 2D STFTs 22, 24, and 26, respectively, are vectorized into 1D mixed domain signals 70, 72 and 74, respectively. The vectorizing of TFD 28 into a 1D mixed domain signals 70 vector is further illustrated in FIGS. 2B and 2C, which show a particular example of interleaving; however, other forms of interleaving may be used.

The 1D mixed domain signals 70, 72 and 74 are formed from the TFDs 28, 30 and 32 by interleaving the time and frequency parts of the TFDs, or in other words by reshaping the STFT output TFDs 28, 30 and 32 matrices into mixed frequency (f) and time (t) vectors. The 1D mixed domain signals 70, 72 and 74 are then used as the inputs to a single BSS 100. A key point is that the interleaving of f and t is preserved by the linear BSS operation 100 since it estimates a demixing matrix that multiplies the inputs 70, 72 and 74, which doesn't change how the f and t data is interleaved.

The output of the BSS 100 is separated into signal source channels A, B and C. The interleaving of the BSS outputs 78 can then be reversed by reshaping the interleaved 1D vector outputs 80, 82 and 84 back into 2D time frequency distributions 86, 88 and 90. The separated output signals 102, 104 and 106, or A, B and C, respectively, in the original signal domain can then be recovered by performing inverse STFT transforms 92, 94 and 96 on the 2D time frequency distributions 86, 88 and 90, respectively.

The mixed domain BSS of convolutive mixtures, as shown in FIG. 2A, is superior to prior art Fourier-domain BSS methods, an example of which is shown in FIG. 1A, because the output ordering of the frequency channels is guaranteed to always be correct for all of the separated output signals, thereby increasing the accuracy of blind source separation. In addition, only a single BSS operation 100 needs to be performed, which greatly simplifies the algorithm and reduces computational requirements. Another advantage of using a single BSS stage 100 is that all of the information in the signals can used to estimate a single demixing solution. By using a single BSS operation 100, a sliding window for real-time separation of data streams can also be implemented by initializing the solution for the current window using the solution from the previous window. This greatly speeds up the BSS operation since the algorithm has to only adapt to changes in the data stream statistics.

Figure 3A:
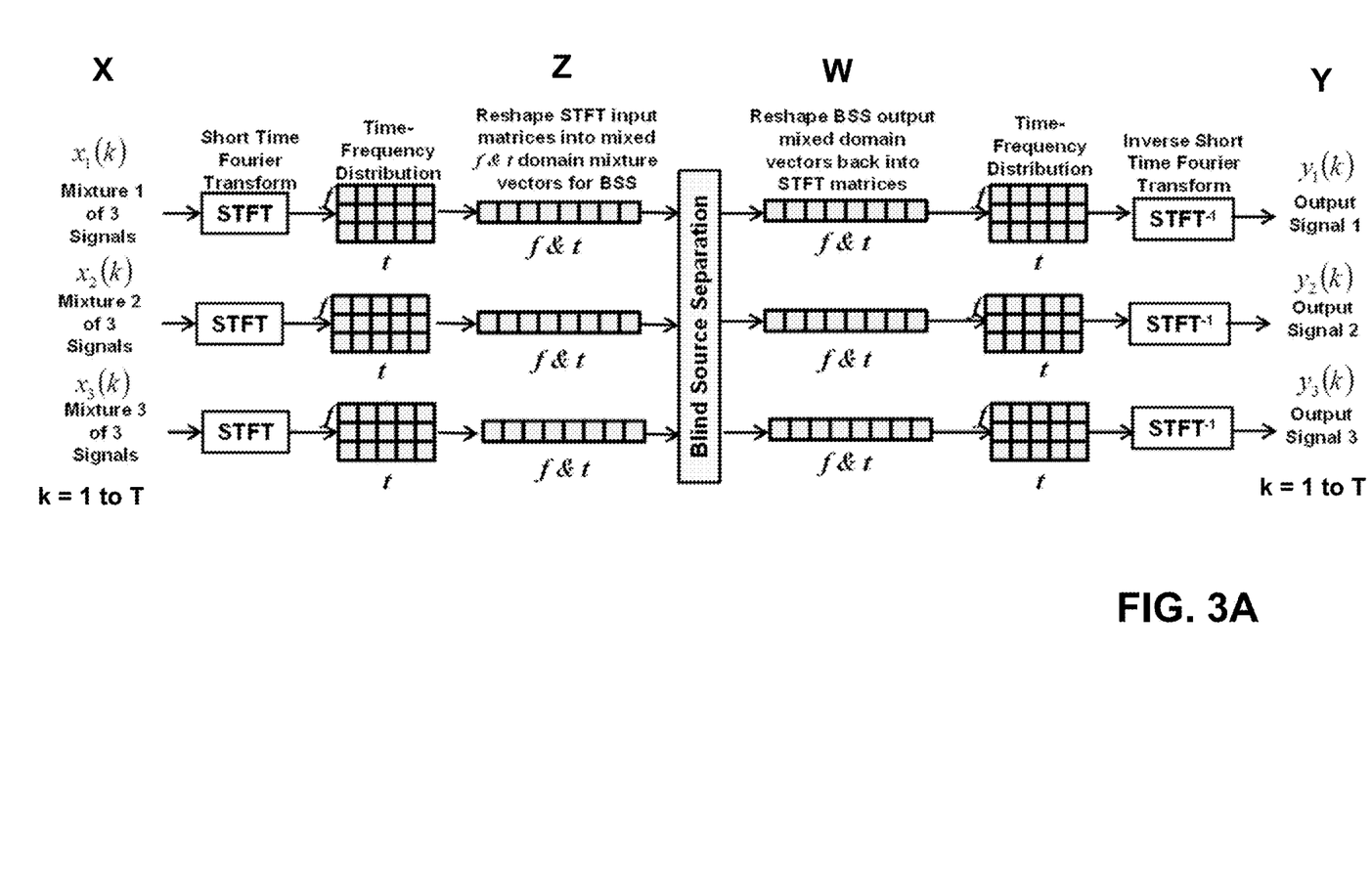
Figure 3B:
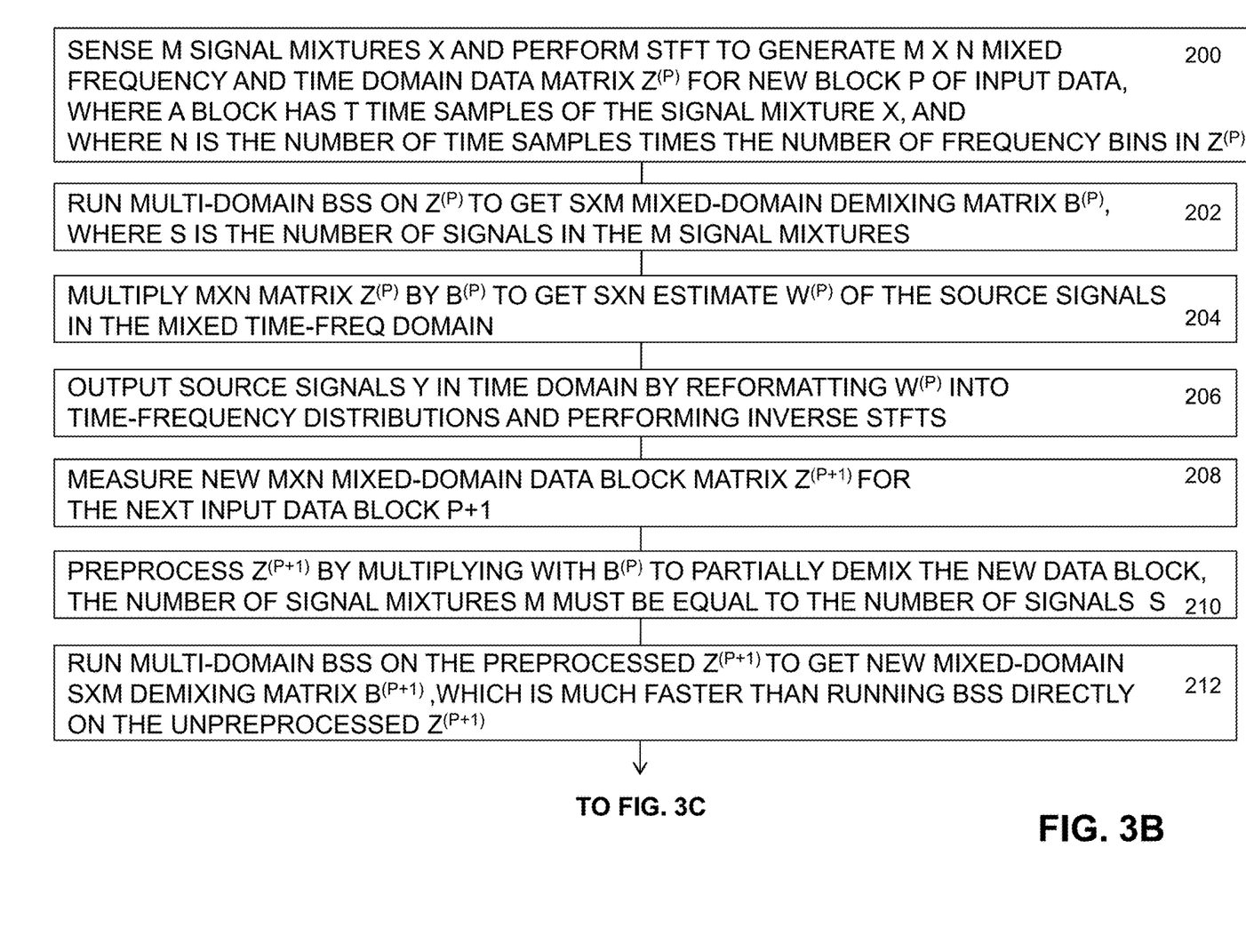
Figure 3C:
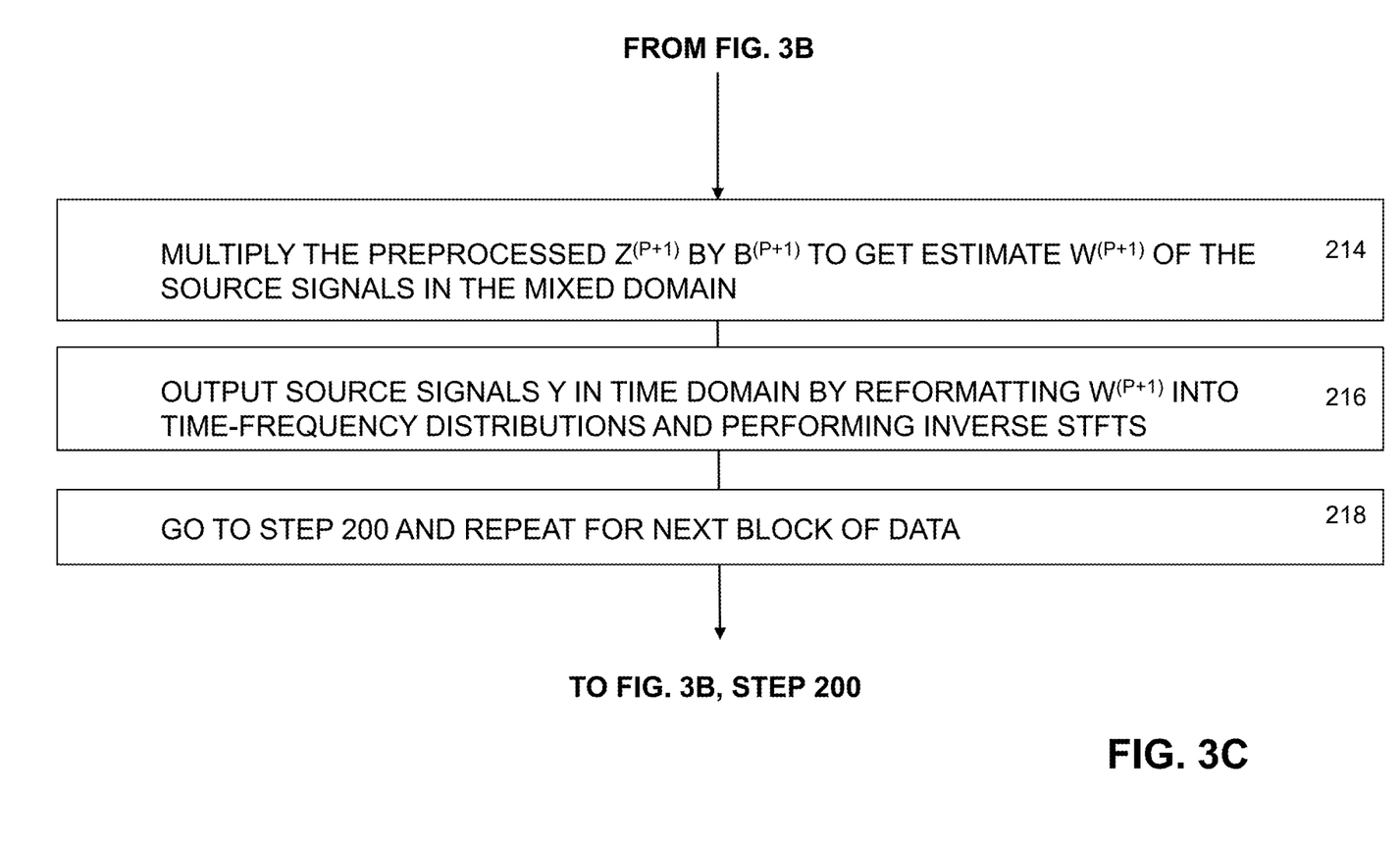

FIGS. 3A, 3B and 3C show a method for fast blind source separation of convolutive mixtures of streaming signals using preprocessing of inputs for reducing the computation burden. FIG. 3A corresponds to FIG. 2A with matrices X, Z, W and Y identified. FIGS. 3B and 3C show a flow chart for a method for streaming mode mixed domain blind source separation (BSS). In this method the number of signal mixtures M must be equal to the number of signals S in the signal mixtures.

First, as shown in step 200, sense M signal mixtures X and perform a short time Fourier transform (STFT) for each signal mixture to generate a M×N mixed frequency and time domain data matrix $Z^{(p)}$ for new block p of input data, where a block has T time samples of the signal mixtures X, and where N is the number of time samples times the number of frequency bins in $Z^{(p)}$. Then, as shown in step 202, run multi-domain BSS on $Z^{(p)}$ to get a S×M mixed-domain demixing matrix $B^{(p)}$, where S, the number of signals S in the M signal mixtures is equal to M. Next, as shown in step 204, multiply the M×N matrix $Z^{(p)}$ by $B^{(p)}$ to get an S×N estimate $W^{(p)}$ of the source signals S. Then, as shown in step 206, output source signals Y in the time domain by reformatting $W^{(p)}$ into time-frequency distributions and performing inverse STFTs. Next, as shown in step 208, measure a new M×N mixed-domain data block matrix $Z^{(p+1)}$ for the next input data block p+1. Next, as shown in step 210, preprocess $Z^{(p+1)}$ by multiplying with $B^{(p)}$ to partially demix the new data block p+1. Then, as shown in step 212, run multi-domain BSS on the preprocessed $Z^{(p+1)}$ to get new mixed-domain S×M demixing matrix $B^{(p+1)}$, which is much faster than running BSS directly on the unpreprocessed $Z^{(p+1)}$. Next, as shown in step 214, multiply the preprocessed $Z^{(p+1)}$ by $B^{(p+1)}$ to get estimate $W^{(p+1)}$ of the source signals in the mixed domain. Then, as shown in step 216, output source signals Y in time domain by reformatting $W^{(p+1)}$ into time-frequency distributions and performing inverse STFTs. Next, go to step 200 and repeat for next block of data.

Figure 4A:
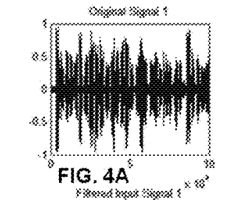
FIGS. 4A, 4B, 4C, 4D, 4E, 4F, 4G, 4H, 4I, 4J, 4K, and 4L, and FIGS. 5A, 5B, 5C, 5D, 5E, 5F, 5G, 5H, 5I, 5J, 5K, and 5L demonstrate mixed domain BSS using convolutive mixtures of speech signals in accordance with the present disclosure.
Figure 4B:
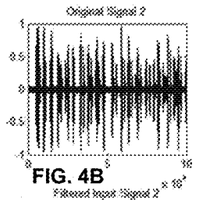
Figures 4C, 5A:
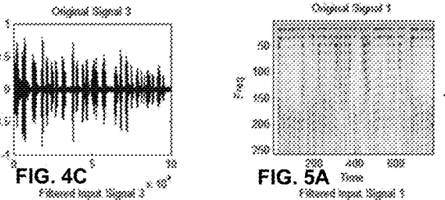
Figure 4D:
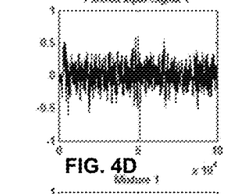
Figure 4E:
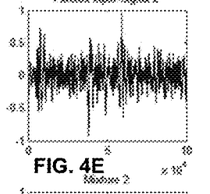
Figure 4F:
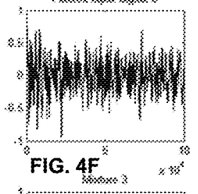
Figure 4G:
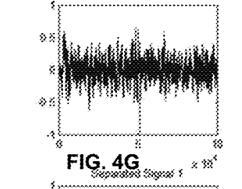
Figure 4H:
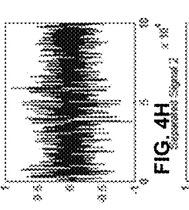
Figure 4I:
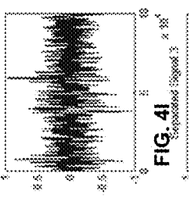
Figure 4J:
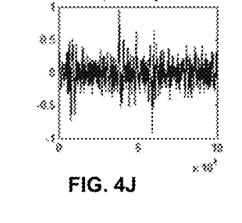
Figure 4K:
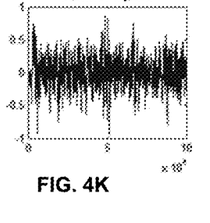
Figure 4L:
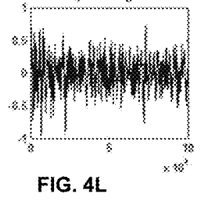
Figure 5B:
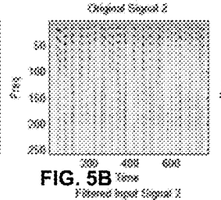
Figure 5C:
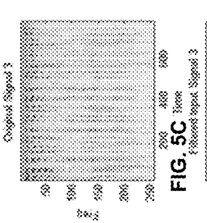
Figure 5D:
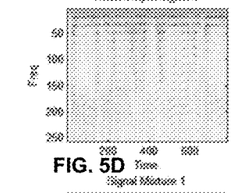
Figure 5E:
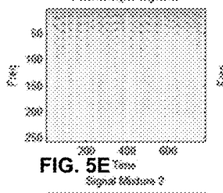
Figure 5F:
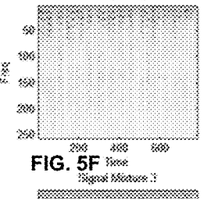
Figure 5G:
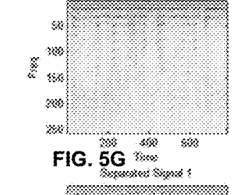
Figure 5H:
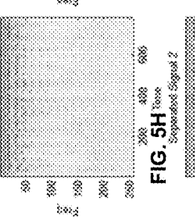
Figure 5I:
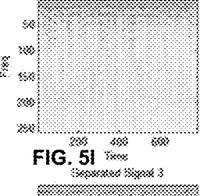
Figure 5J:
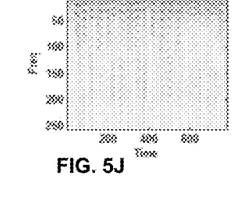
Figure 5K:
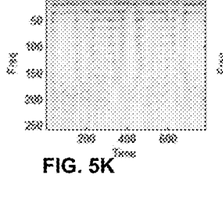
Figure 5L:
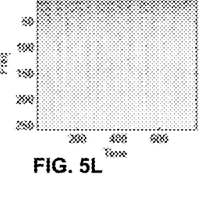

The mixed-domain BSS, as shown in the example of FIG. 2A has been reduced to practice using convolutive mixtures of speech signals, as shown in FIGS. 4A, 4B, 4C, 4D, 4E, 4F, 4G, 4H, 4I, 4J, 4K, and 4L. Recordings were made of three speakers saying the alphabet or numbers in English and Spanish, as shown in FIGS. 4A, 4B and 4C. The signals were then mixed together into convolutive mixtures. The mixed domain BSS was able to separate the mixtures into individual source signals, as shown in FIGS. 4J, 4K and 4L. The BSS outputs are filtered versions of the original source signals, but deconvolution methods can be used to retrieve the original signals, if needed.

FIGS. 5A, 5B, 5C, 5D, 5E, 5F, 5G, 5H, 5I, 5J, 5K, and 5L show the time frequency domain corresponding to FIGS. 4A, 4B, 4C, 4D, 4E, 4F, 4G, 4H, 4I, 4J, 4K, and 4L. Signals at different stages of processing are shown in both the original time domain and the time-frequency domain using the short time fourier transform (STFT). FIGS. 4A, 4B, 4C, and FIGS. 5A, 5B, 5C show the original unfiltered signals. FIGS. 4D, 4E, 4F, and FIGS. 5D, 5E, 5F show the filtered versions of input signals created by convolving the original signals with filters representing multiple path delays. FIGS. 4G, 4H, 4I, and FIGS. 5G, 5H, 5I show convolutive signal mixtures received by sensors, such as sensors 16, 18 and 20. FIGS. 4J, 4K, 4L, and FIGS. 5J, 5K, 5L show the outputs of the mixed domain BSS, as shown in FIG. 2A.

The convolutive mixtures of filtered speech signals from three speakers, as shown in FIGS. 4G, 4H, 4I, and FIGS. 5G, 5H, 5I have an "echo chamber" quality of the signals due to the multiple path delays that result in the convolutive mixtures. Playable sound files corresponding to the plots are easier to interpret to verify that the mixed domain BSS is able to separate the signals from the three speakers. Sound files of convolutive mixtures of filtered speech signals from three speakers saying the alphabet or numbers in English and Spanish were tested, and demonstrated an "echo chamber" quality of the signals due to the multiple path delays that result in convolutive mixtures.

After processing, the three sound files for the outputs of mixed domain BSS in accordance with the present disclosure have separated speaker signals.

The outputs of the mixed domain BSS separate the speaker signals so that one speaker can be heard to be saying the alphabet, a second speaker can be heard to say numbers in English, and a third speaker can be heard to say numbers in Spanish.

Once the signals have been separated into the original sources convolved with the channel filters, deconvolution methods can be used to remove the effects of the channel filters, if needed.

Thus, the present invention has described a mixed domain method for performing blind source separation (BSS) of convolutive mixtures of signals which enables individual signals to be extracted and analyzed without interference from the other signals.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . "

What is claimed is:

1. A method for increasing accuracy and reducing computational requirements for blind source separation of mixtures of signals in multi-path environments comprising:
   receiving a plurality of channel inputs, wherein each channel input is from a respective channel and comprises a mixture of signals from a plurality of sources;
   performing a plurality of short time Fourier transforms on each channel input of the plurality of channels, wherein a respective output of a respective short time Fourier transform on a respective channel is a time-frequency distribution matrix, where the time-frequency distribution matrix is arranged by frequency bin in a first direction and time in a second direction of the time-frequency distribution matrix;

vectorizing the time-frequency distribution matrix for each respective channel into a respective interleaved frequency and time row vector, wherein time samples of a respective frequency of the time-frequency distribution matrix are adjacent one another and ordered by time in the respective interleaved frequency and time row vector; and performing blind source separation simultaneously on the interleaved frequency and time row vectors for all the channels to separate the mixture of signals from the plurality of sources into a plurality of signal source channels, each respective signal source channel comprising signals from a respective source.

2. The method of claim 1 further comprising:

forming a respective source time frequency distribution matrix for each respective signal source channel;

performing a respective inverse short time Fourier transform for each respective source time frequency distribution matrix; and outputting a respective output signal for each respective signal source channel.

3. The method of claim 1 wherein receiving a plurality of channel inputs comprises sensing with a plurality of sensors, a sensor array, a sensor network, a microphone array, an antenna array, or a sonar sensor array.

4. The method of claim 1 wherein receiving a plurality of channel inputs comprises:

sensing with microphone arrays that record multiple sound signals in a reverberative environment;

sensing with smart antennas that receive RF signals reflected and scattered in urban environments; or sensing with sonar sensor arrays that detect signals that follow multiple paths in an ocean environment.

5. The method of claim 1 wherein the mixture of signals from the plurality of sources may be represented as a sum of convolutions of source signals with different channel filters $$x_i(k) = \sum_{j=1}^{n} \sum_{p=0}^{L} a_{ij}(p) s_j(k-p)$$

where $x_i(k)$ is the mixture of signals from the plurality of sources for channel i at time k;

where $s_j$ is a signal from source j;

where n is a number of sources;

where p is an time index ranging from 0 to L; and where $a_{ij}$ are filter coefficients representing delays of transmission channels for different signal paths.

6. The method of claim 1 wherein performing blind source separation comprises:

independent component analysis;

mutual independence, non gaussianity, independent component analysis;

non-stationarity, time varying variances;

time-frequency, spectral and spatial, or spatial diversities; or temporal-structure, linear predictability, non-whiteness.

7. The method of claim 1 wherein:

performing a short time Fourier transform comprises performing a short time Fourier transform on a series of sliding windows for each channel; and wherein each sliding window may overlap the next sliding window by varying amounts.

8. A device for blind source separation of mixtures of signals in multi-path environments comprising:

a plurality of channel inputs, wherein each channel input is from a respective channel and comprises a mixture of signals from a plurality of sources; and a processor coupled to each channel input, the processor configured for:

performing a plurality of short time Fourier transforms on each channel input of the plurality of channels, wherein a respective output of a respective short time Fourier transform on a respective channel is a time-frequency distribution matrix, where the time-frequency distribution matrix is arranged by frequency bin in a first direction and time in a second direction of the time-frequency distribution matrix;

vectorizing the time-frequency distribution matrix for each respective channel into a respective interleaved frequency and time row vector, wherein time samples of a respective frequency of the time-frequency distribution matrix are adjacent one another and ordered by time in the respective interleaved frequency and time row vector; and performing blind source separation simultaneously on the interleaved frequency and time row vectors for all the channels to separate the mixture of signals from the plurality of sources into a plurality of signal source channels, each respective signal source channel comprising signals from a respective source.

9. The device of claim 8 wherein the processor is further configured for:

forming a respective source time frequency distribution matrix for each respective signal source channel;

performing a respective inverse short time Fourier transform for each respective source time frequency distribution matrix; and outputting a respective output signal for each respective signal source channel.

10. The device of claim 8 wherein the plurality of channel inputs comprises a plurality of sensor inputs from a sensor array, a sensor network, a microphone array, an antenna array, or a sonar sensor array.

11. The device of claim 10 wherein the sensor array comprises:

microphone arrays that record multiple sound signals in a reverberative environment;

smart antennas that receive RF signals reflected and scattered in urban environments; or sonar sensor arrays that detect signals that follow multiple paths in an ocean environment.

12. The device of claim 8 wherein the mixture of signals from the plurality of sources may be represented as a sum of convolutions of source signals with different channel filters $$x_i(k) = \sum_{j=1}^{n} \sum_{p=0}^{L} a_{ij}(p) s_j(k-p)$$

where $x_i(k)$ is the mixture of signals from the plurality of sources for channel i at time k;

where $s_j$ is a signal from source j;

where n is a number of sources;

where p is an time index ranging from 0 to L; and where $a_{ij}$ are filter coefficients representing delays of transmission channels for different signal paths.

13. The device of claim 8 wherein performing blind source separation comprises:
  independent component analysis;
  mutual independence, non gaussianity, independent component analysis;
  non-stationarity, time varying variances;
  time-frequency, spectral and spatial, or spatial diversities; or
  temporal-structure, linear predictability, non-whiteness.

14. The device of claim 8 wherein:
  performing a short time Fourier transform comprises performing a short time Fourier transform on a series of sliding windows for each channel input; and
  wherein each sliding window may overlap the next sliding window by varying amounts.

15. A method for fast blind source separation of convolutive mixtures of streaming signals using preprocessing of inputs for reducing a computation burden comprising:
  sensing M signal mixtures X;
  performing a short time Fourier transform (SIFT) for each signal mixture to generate a M×N mixed frequency and time domain data matrix $Z^{(p)}$ for a block p of input data, where a block has T time samples of the signal mixtures X, and where N is the number of time samples times the number of frequency bins in $Z^{(P)}$;
  performing a multi-domain blind source separation (BSS) on $Z^{(p)}$ to generate a S×M mixed-domain demixing matrix $B^{(p)}$, where S, the number of signals S in the M signal mixtures and where S is equal to M;
  multiplying the M×N matrix $Z^{(p)}$ by $B^{(p)}$ to generate an S×N estimate $W^{(p)}$ of the source signals S;
  outputting source signals Y in the time domain by reformatting $W^{(p)}$ into time-frequency distributions;
  performing inverse STFTs on the time-frequency distributions;
  measuring a M×N mixed-domain data block matrix $Z^{(p+1)}$ for the next input data block p+1;
  preprocessing $Z^{(p+1)}$ by multiplying $Z^{(p+1)}$ with $B^{(p)}$ to partially demix the data block p+1;
  performing multi-domain BSS on the preprocessed $Z^{(p+1)}$ to generate a mixed-domain S×M demixing matrix $B^{(p+1)}$;
  multiply the preprocessed $Z^{(p+1)}$ by $B^{(p+1)}$ to generate an estimate $W^{(p+1)}$ of the source signals in the mixed domain;
  reformatting $W^{(p+1)}$ into time-frequency distributions; and
  performing inverse STFTs to output source signals Y in time domain.

16. The method of claim 15 further comprising repeating the steps of claim 15 for a next block of data.

17. The method of claim 15 wherein performing blind source separation comprises:
  independent component analysis;
  mutual independence, non gaussianity, independent component analysis;
  non-stationarity, time varying variances;
  time-frequency, spectral and spatial, or spatial diversities; or
  temporal-structure, linear predictability, non-whiteness.

18. The method of claim 15 wherein sensing M signal mixtures X comprises sensing with a X sensors, sensing with an X element sensor array, sensing with a sensor network, sensing with an X element microphone array, sensing with an antenna array, or sensing with a sonar sensor array.

19. A device for fast blind source separation of convolutive mixtures of streaming signals using preprocessing of inputs for reducing a computation burden comprising:
  a plurality of sensors for sensing M signal mixtures X; and
  a processor coupled to each of the plurality of sensors, the processor configured for:
  performing a short time Fourier transform (STFT) for each signal mixture to generate a M×N mixed frequency and time domain data matrix $Z^{(p)}$ for a block p of input data, where a block has T time samples of the signal mixtures X, and where N is the number of time samples times the number of frequency bins in $Z^{(P)}$;
  performing a multi-domain blind source separation (BSS) on $Z^{(p)}$ to generate a S×M mixed-domain demixing matrix $B^{(p)}$, where S, the number of signals S in the M signal mixtures and where S is equal to M;
  multiplying the M×N matrix $Z^{(p)}$ by $B^{(p)}$ to generate an S×N estimate $W^{(p)}$ of the source signals S;
  outputting source signals Y in the time domain by reformatting $W^{(p)}$ into time-frequency distributions;
  performing inverse STFTs on the time-frequency distributions;
  measuring a M×N mixed-domain data block matrix $Z^{(p+1)}$ for the next input data block p+1;
  preprocessing $Z^{(p+1)}$ by multiplying $Z^{(p+1)}$ with $B^{(p)}$ to partially demix the data block p+1;
  performing multi-domain BSS on the preprocessed $Z^{(p+1)}$ to generate a mixed-domain S×M demixing matrix $B^{(p+1)}$;
  multiply the preprocessed $Z^{(p+1)}$ by $B^{(p+1)}$ to generate an estimate $W^{(p+1)}$ of the source signals in the mixed domain;
  reformatting $W^{(p+1)}$ into time-frequency distributions; and
  performing inverse STFTs to output source signals Y in time domain.

20. The device of claim 19 further comprising the processor configured for repeating for a next block of data:
  performing a short time Fourier transform (STFT) for each signal mixture to generate a M×N mixed frequency and time domain data matrix $Z^{(p)}$ for a block p of input data, where a block has T time samples of the signal mixtures X, and where N is the number of time samples times the number of frequency bins in $Z^{(P)}$;
  performing a multi-domain blind source separation (BSS) on $Z^{(p)}$ to generate a S×M mixed-domain demixing matrix $B^{(p)}$, where S, the number of signals S in the M signal mixtures and where S is equal to M;
  multiplying the M×N matrix $Z^{(p)}$ by $B^{(p)}$ to generate an S×N estimate $W^{(p)}$ of the source signals S;
  outputting source signals Y in the time domain by reformatting $W^{(p)}$ into time-frequency distributions;
  performing inverse STFTs on the time-frequency distributions;
  measuring a M×N mixed-domain data block matrix $Z^{(p+1)}$ for the next input data block p+1;
  preprocessing $Z^{(p+1)}$ by multiplying $Z^{(p+1)}$ with $B^{(p)}$ to partially demix the data block p+1;
  performing multi-domain BSS on the preprocessed $Z^{(p+1)}$ to generate a mixed-domain S×M demixing matrix $B^{(p+1)}$;
  multiply the preprocessed $Z^{(p+1)}$ by $B^{(p+1)}$ to generate an estimate $W^{(p+1)}$ of the source signals in the mixed domain;
  reformatting $W^{(p+1)}$ into time-frequency distributions; and
  performing inverse STFTs to output source signals Y in time domain.

21. The device of claim 19 wherein performing blind source separation comprises:

independent component analysis;

mutual independence, non gaussianity, independent component analysis;

non-stationarity, time varying variances;

time-frequency, spectral and spatial, or spatial diversities; or temporal-structure, linear predictability, non-whiteness.

22. The device of claim 19 wherein sensing M signal mixtures X comprises sensing with a X sensors, sensing with an X element sensor array, sensing with a sensor network, sensing with an X element microphone array, sensing with an antenna array, or sensing with a sonar sensor array.

* * * * *